(12) United States Patent
Morgan

(10) Patent No.: US 6,394,359 B1
(45) Date of Patent: May 28, 2002

(54) REMOTE CONTROL THERMOSTAT

(76) Inventor: Arthur Morgan, 1357 Federal Ave., LaPorte, IN (US) 46350

( * ) Notice: Subject to any disclaimer, the term of this patent is extended or adjusted under 35 U.S.C. 154(b) by 0 days.

(21) Appl. No.: 09/614,110

(22) Filed: Jul. 12, 2000

Related U.S. Application Data
(60) Provisional application No. 60/142,974, filed on Jul. 12, 2000.

(51) Int. Cl.$^7$ .............................. G05D 23/00; F23N 5/20
(52) U.S. Cl. ............................................ 236/51; 236/94
(58) Field of Search ................................ 236/51, 47, 94

(56) References Cited

U.S. PATENT DOCUMENTS

| | | | |
|---|---|---|---|
| 3,972,471 A | 8/1976 | Ziegler | 236/68.8 X |
| 4,032,069 A | 6/1977 | Cannella | 236/46 R |
| 4,205,782 A | 6/1980 | Cannella | 236/46 R |
| 4,336,902 A | 6/1982 | Neal | 236/51 X |
| 4,353,502 A | 10/1982 | Myers | 236/47 |
| 4,433,719 A | 2/1984 | Cherry et al. | 236/51 X |
| 4,682,648 A * | 7/1987 | Fried | 236/51 X |
| 4,969,508 A | 11/1990 | Tate et al. | 236/51 X |
| 5,224,353 A * | 7/1993 | Nagasawa | 236/51 X |
| 5,272,477 A * | 12/1993 | Tashima et al. | 236/51 X |
| 5,361,982 A * | 11/1994 | Liebl et al. | 236/47 |
| 5,386,461 A | 1/1995 | Gedney | 379/102 |

* cited by examiner

*Primary Examiner*—William Wayner
(74) *Attorney, Agent, or Firm*—John D. Gugliotta

(57) ABSTRACT

This invention is a remote control device to control a thermostat. The remote control works using RF transceivers in base a wall mounted base unit and a portable remote control unit, or optionally, using infrared signals much like a television remote control. The remote control has a keypad on it to allow one to select the desired temperature, or to select a temperature from one of several buttons on it corresponding to a specific temperature. This enables the user to set the temperature of a room without having to get up and manually change it.

6 Claims, 5 Drawing Sheets

15

REMOTE CONTROL THERMOSTAT

RELATED APPLICATIONS

The present invention is a Continuation of United States Provisional Patent Application No. 60/142,974, filed on Jul. 12, 2000.

BACKGROUND OF THE INVENTION

1. Field of the Invention

The present invention relates generally to temperature control and, more particularly, to a wireless remotely controlled thermostat for regulating room temperature.

2. Description of the Related Art

In the related art, there exists various devices to regulate room temperature. Typically this is done via a thermostat. The prior art includes such devices and various schemes whereby such thermostats can be remotely activated. There also exists inventions where wireless technology is used to regulate room temperature. However, the present invention has several novel features over the prior art as discussed below.

Regardless of geographic location, virtually every American's home includes a climate control system for regulating the room temperature inside the dwelling. Typically consisting of a heating unit and an air conditioning unit, these devices are controlled by thermostats that switch the heating unit/air conditioner on and off in order to maintain a desired ambient temperature. Developed in the past and still in common use today, conventional thermostats incorporate the use of mercury switches or mechanical switches that are triggered by an expansion-type thermoswitch. Modern concerns over energy consumption, however, have resulted in the development of electronic thermostats that incorporate micro-processing technology and solid state switching to allow for accurate, programmable climate control. In fact, many modern home heating and air conditioning systems incorporate the use of automated dampers that allow for regulating the home climate on an individual room basis. In spite of the technological advancements that have been made in the area of home climate control, however, home owners are still required to operate thermostats from a fixed position, usually mounted on a wall in a centrally located position. One desiring to adjust the temperature in one room of the building must go to the room where the thermostat is located to adjust the temperature. This can be inconvenient at night when one is lying in their bedroom. The development of the Remote Control Thermostat eliminates this problem.

A search of the prior art did not disclose any patents that read directly on the claims of the instant invention; however, the following references were considered related:

| U.S. Pat. No. | Inventor | Issue Date |
|---|---|---|
| 5,386,461 | Gedney | January 31, 1998 |
| 4,353,502 | Myers | October 12, 1982 |
| 4,969,508 | Tate et al. | November 13, 1990 |
| 4,336,902 | Neal | June 29, 1982 |
| 3,972,471 | Ziegler | August 3, 1976 |
| 4,433,719 | Cherry, et al. | February 28, 1984 |
| 4,205,782 | Cannella | June 3, 1980 |
| 4,032,069 | Cannella | June 28, 1977 |

Of some relevance is U.S. Pat. No. 4,969,508 issued to Tate et al. The '508 reference discloses a wireless thermostat and room environment control system. The invention of the '508 reference attempts to regulate room temperature via a handheld wireless transmitter which controls a solenoid operated baffle located in the conduit supplying regulated air to individual rooms. This is significantly different than the present invention which is a handheld wireless transmitter which controls the thermostat.

Of considerable relevance is U.S. Pat. No. 4,433,719 issued to Cherry et al. The invention of the '719 reference is a portable thermostat which controls the heating and cooling devices via RF signals. One need merely to carry the thermostat with them into any room to adjust the temperature. The present invention differs from the invention in the '719 reference in that the present invention has a wall mounted base unit for receiving user commands from a wireless handheld unit, much like the remote control of a television. One can have several of the handheld transmitters but there is only one wall mounted base unit. Without a base unit as in the present invention, in contrast to the invention of the '719 reference, one would have no way to adjust the temperature should the handheld transmitter(s) be lost or the batteries discharged. The present invention eliminates this problem.

SUMMARY OF THE INVENTION

It is therefore an object of the present invention to provide a remote control thermostat.

It is a another feature of the present invention to provide full control access from a remote location.

It is yet another feature of the present invention to operate from anywhere within a dwelling.

It is yet still another feature of the present invention to promote energy conservation and efficiency.

It is still yet another feature of the present invention to promote energy conservation and efficiency.

It is another feature of the present invention to provide quick and accurate response to a users commands.

It is yet another feature of the present invention to be programmable.

Briefly described according to one embodiment of the present invention, a Remote Control Thermostat is provided consisting of a fully functional base suited for wall mounting in a convenient location in a manner similar to that of conventional thermostats. The base unit incorporates the full functionality of modern electronic thermostats, allowing for programming functions while providing superior control characteristics. Also included in the system is a battery powered remote control unit that allows the user to adjust the temperature settings from a remote location. Ideally suited for the elderly and the handicapped, the house climate can be regulated to a comfortable level without the hassle and burden associated with getting up and accessing the wall mounted unit. As a result, use of the Remote Control Thermostat allows one to monitor and control their home climate control system in a convenient yet effective manner.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

LIST OF REFERENCE NUMBERS

| | | | |
|---|---|---|---|
| 10 | base unit | 105 | back light control switch |
| 15 | remote control unit | 110 | light timing module |
| 20 | power supply | 115 | lamps |
| 25 | conventional thermostat connection | 120 | remote temperature control pushbuttons |
| 30 | first battery | 125 | remote fan control switch |
| 35 | main microprocessor controller | 130 | remote temperature sensor |
| | | 135 | remote readout display |
| 40 | local temperature control pushbuttons | 140 | third display driver |
| | | 145 | remote unit transceiver module |
| 45 | fan control switch | | |
| 50 | temperature sensing device | 150 | remote unit antenna |
| 55 | base unit transceiver module | 160 | first functional block |
| 60 | base unit antenna | 165 | first operational block |
| 65 | RF signals | 170 | second operational block |
| 70 | ambient temperature readout | 175 | second functional block |
| 75 | first display driver | 180 | third operational block |
| 80 | set-point temperature readout | 185 | fourth operational block |
| 85 | second display driver | 190 | fifth operational block |
| 90 | output control relay module | 195 | third functional block |
| 95 | second battery | 200 | sixth operational block |
| 100 | remote microprocessor controller | 205 | fourth functional block |

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
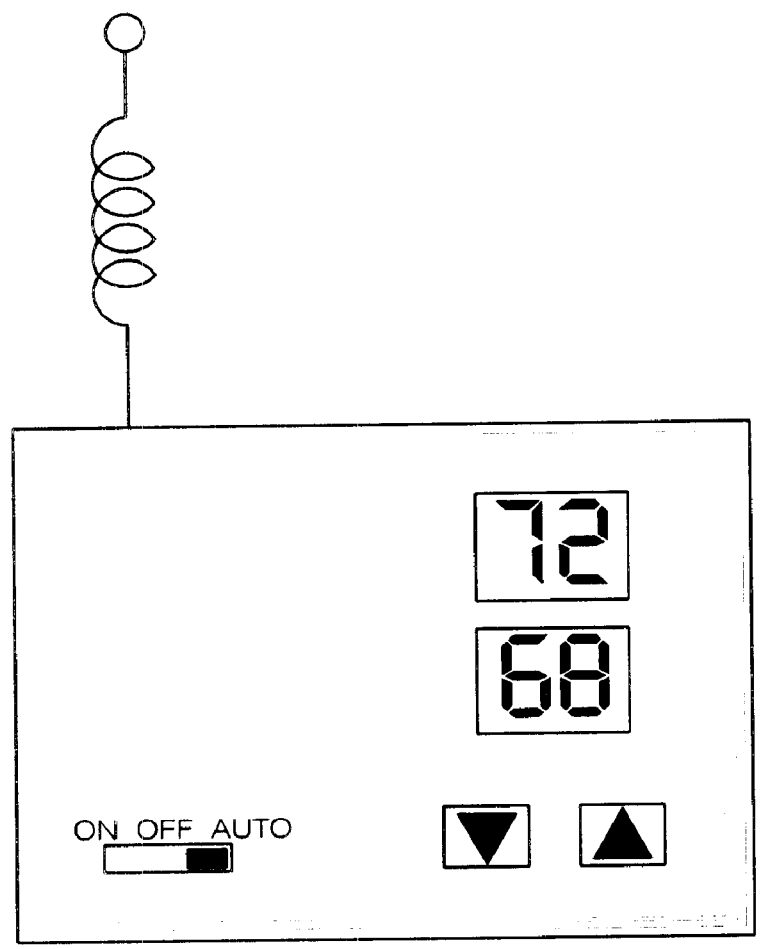
FIG. 1 is a front view of a Remote Control Thermostat, according to the preferred embodiment of the present invention.
Figure 1:

Referring now to FIG. 1, shown is a Remote Control Thermostat, according to the preferred embodiment of the present invention, comprised of a base unit 10 for mounting on the wall of a structure and a remote control unit 15 for carrying throughout the structure. Base unit 10 is an otherwise conventional thermostat typically found in the home or office with a low power transceiver coupled to the temperature sensing and regulating functions of the thermostat. Base unit 10 should be centrally located in the structure so that the local temperature reading should be representative of the temperature throughout the structure. This requires that base unit 10 be placed on a wall free from drafts from leaky doors or windows or exposed to direct sunlight. As is typical with a thermostat, base unit 10 would electronically control the temperature in the room by comparing the local temperature to a desired temperature input set into the thermostat by the user. If the local temperature is above or below the desired set temperature, a signal is sent via low voltage circuitry to either a heating unit or an air conditioning unit to raise or lower the temperature until the desired temperature is reached. In this fashion, one can have the temperature that they are most comfortable at all times regardless of the temperature outside. Base unit 10 allows one to set that desired temperature from a remote location via a radio frequency signal. The specially designed transceiver built into base unit 10 is designed to receive radio signals from a remote control unit 15 which allows a user to select the desired temperature. The user can also input the desired temperature from a keypad located on base unit 10 itself. The transceiver also transmits a signal back to remote control unit 15 indicating the local temperature at base unit 10. This is essential to the operation of the Remote Control Thermostat in case the local temperature at base unit 10 is different from the local temperature at remote control unit 15. By the user knowing the difference between the two local temperatures the user can select the desired temperature accordingly. The temperature selected on the remote control unit will be the temperature that base unit 10 will bring the local temperature to. Of course the Remote Control Thermostat will have enough power such that the signal strength from every room in the structure can reach the base unit 10 and remote control unit 15 but not so much power that other owners of a Remote Control Thermostat in the same neighborhood will suffer interference. The Remote Control Thermostat is designed with conventional microelectronics including the use of microprocessor and off-the-shelf radio transceiver components using existing known technologies. It is envisioned that a conventional nine-volt battery would provide sufficient electrical power for both the base unit 10 and the remote control unit 15.

Figure 2:
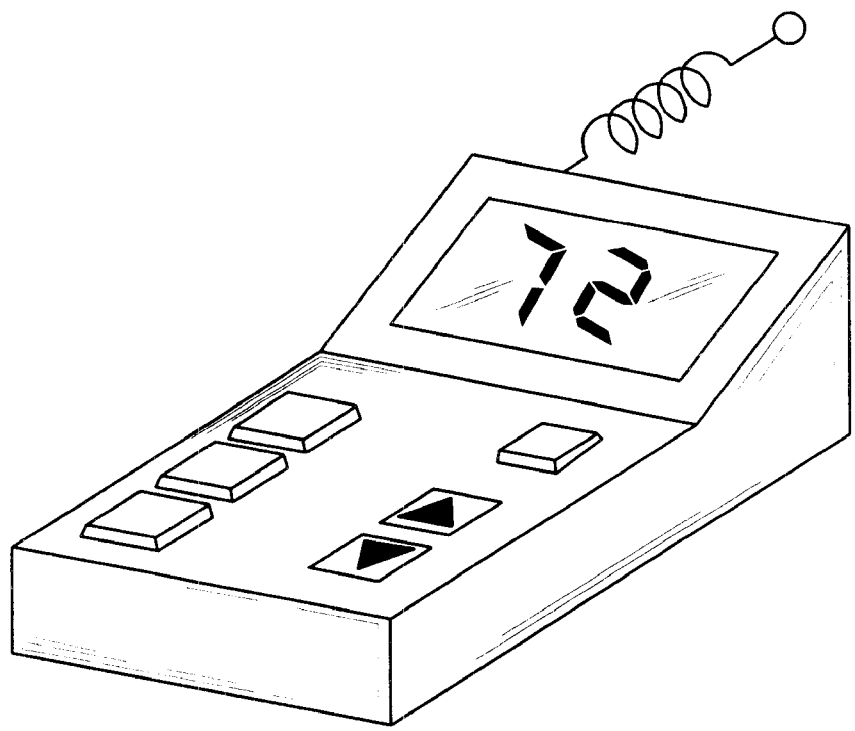
FIG. 2 is a perspective view of a remote control for a Remote Control Thermostat, according to the preferred embodiment of the present invention.

Referring to FIG. 2, shown is a perspective view of a remote control unit 15 from a Remote Control Thermostat, according to the preferred embodiment of the present invention. Remote control unit 15 is a portable, handheld device having an input keypad, a digital display, an RF transceiver, a temperature sensor, and a microprocessor. The temperature sensor is designed to constantly monitor the temperature local around remote control unit 15. This information is available to the user via a button on the keypad. The keypad has many buttons on it including a numeric keypad plus additional buttons that perform specific functions which give the microprocessor specific instructions. Normally, the operating instructions of the microprocessor are designed to receive a specific numeric input from the keypad, representing the temperature desired, for example, 68°, and transmit it via the transceiver to base unit 10 to adjust the temperature accordingly. Other functions that are available are to turn the heating or air conditioning systems on or off. One may also adjust the temperature in 2° increments via two special keys marked with arrows to indicate temperature up or down. In an alternate embodiment, it is envisioned that keys representing specific temperatures may be included directly on the keypad, beginning at, for instance, 50° at 5° intervals until a temperature of 95°. This would eliminate the user having to push many buttons to adjust the temperature when it may be inconvenient like when it is dark at night. In either embodiment, the instructions are sent via the keypad to the microprocessor which in turn sends it to the transceiver to be carried to base unit 10 to adjust the temperature accordingly. A button located conspicuously on the keypad is also present for a light to illuminate the keypad for a short interval as desired. Remote control unit 15 is designed and built with readily available electronic components utilizing well known existing technologies. Base unit 10 is designed so that it can receive an instructional RF signal from any remote control unit 15 utilizing the same carrier frequency. In this fashion, many remote control units 15 can be purchased to operate a single base unit 10. One can purchase many remote control units 15 and put them in any room in the structure for remote operation of base unit 10.

In an alternate preferred embodiment, the RF transceiver in both base unit 10 and remote control unit 15 is replaced with infrared transmitters and receivers whereby a desired temperature setting is sent to base unit 10 via infrared light, much like the operation of a TV remote control. However, there are significant limitations to this design in terms of the receiving and transmitting ranges and obstacles such as walls which prevent IR signals from passing. Nonetheless, this is an acceptable way for remotely controlling temperature from within a room or a short distance.

Figure 3:
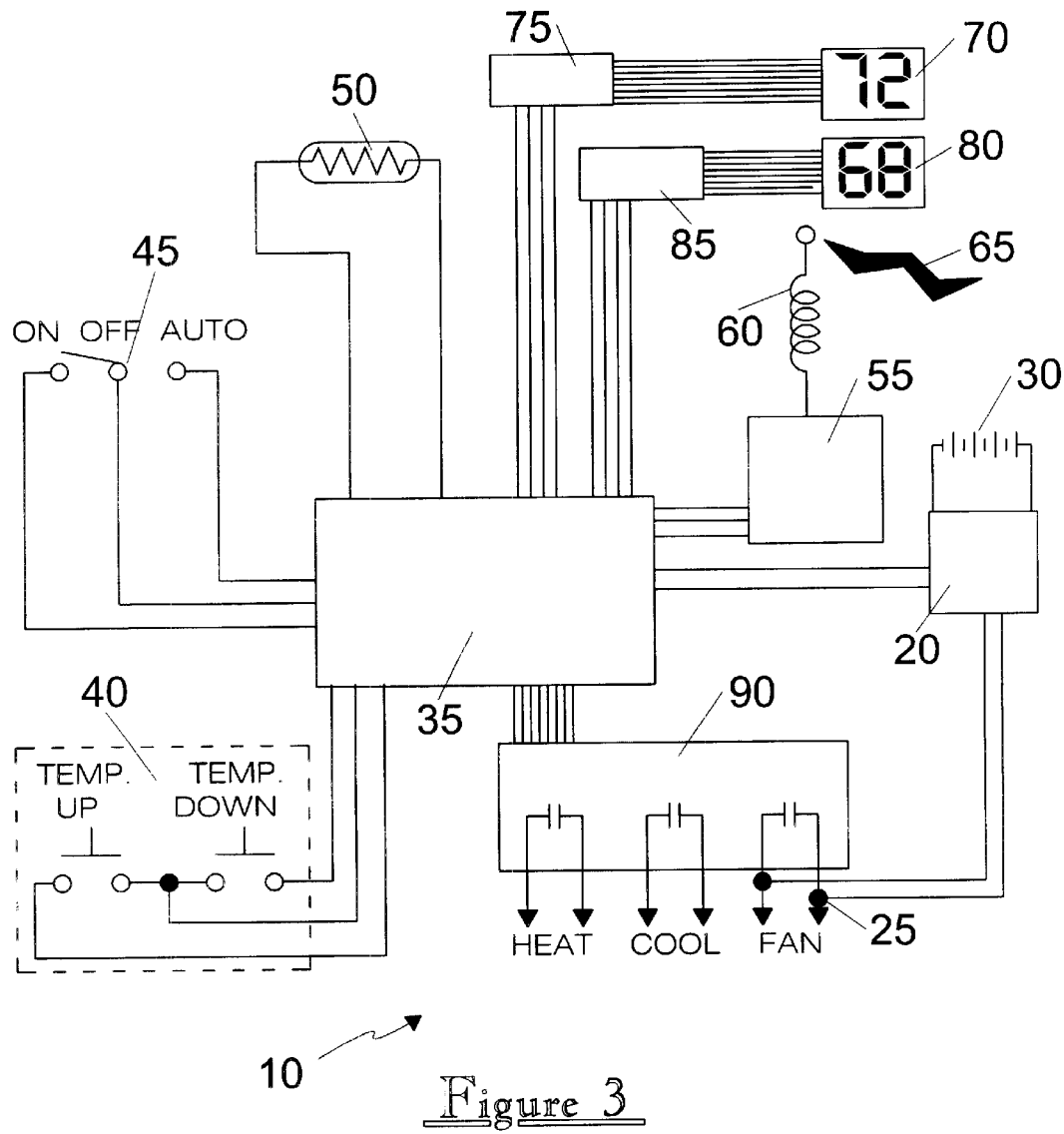
FIG. 3 is a block-type electrical diagram of the base unit, according to the preferred embodiment of the present invention.

Referring next to FIG. 3, a block-type electrical schematic of the base unit 10 from a Remote Control Thermostat, according to the preferred embodiment of the present invention is disclosed. A power supply 20 receives electrical power from a conventional thermostat connection 25 or a first battery 30. The conventional thermostat connection 25 provides power in the same manner as conventional thermostats, and as such requires no external connections to power or specialized hookups. The power supply 20 provides electrical power to a main microprocessor controller 35. The main microprocessor controller 35 receives input signals from four sources. First, a set of local temperature control pushbuttons 40, provide for the up and down setting of the desired temperature in 2° increments. Second, a fan control switch 45, provides user control over the fan, in that is always off, always on, or automatically running whenever heating or cooling is called for. Third, a temperature sensing device 50.is provided for local ambient air sensing, so that the control feedback loop can be closed and a comfortable temperature can be maintained. Finally, fourth is a base unit transceiver module 55 which interacts with the remote control unit 15 providing both input and output signals. The relationship of the remote control unit 15 with the base unit transceiver module 55 will be explained in greater detail herein below. A base unit antenna 60 is provided for the transmission of RF signals 65, but infrared signals could be used with line-of-sight effectiveness as explained above. The main microprocessor controller 35 also provides three sets of output signals. First, the current ambient temperature is displayed on an ambient temperature readout 70. The ambient temperature readout 70 receives its signal through a first display driver 75 which is electrically coupled to the main microprocessor controller 35. Second, the current set-point of the Remote Control Thermostat is displayed on a set-point temperature readout 80. The set-point temperature readout 80 receives its signal through a second display driver 85 which is electrically coupled to the main microprocessor controller 35. Finally, third, the main microprocessor controller 35 provides operational signals to the heating and/or cooling device through an output control relay module 90. The output control relay module 90 would be capable of providing up to three signals, one to energize the heating equipment, one to energize the cooling equipment and one to energize the fan portion of either the heating and/or cooling equipment. Such universal design would allow the Remote Control Thermostat to be used with any type of equipment.

Figure 4:
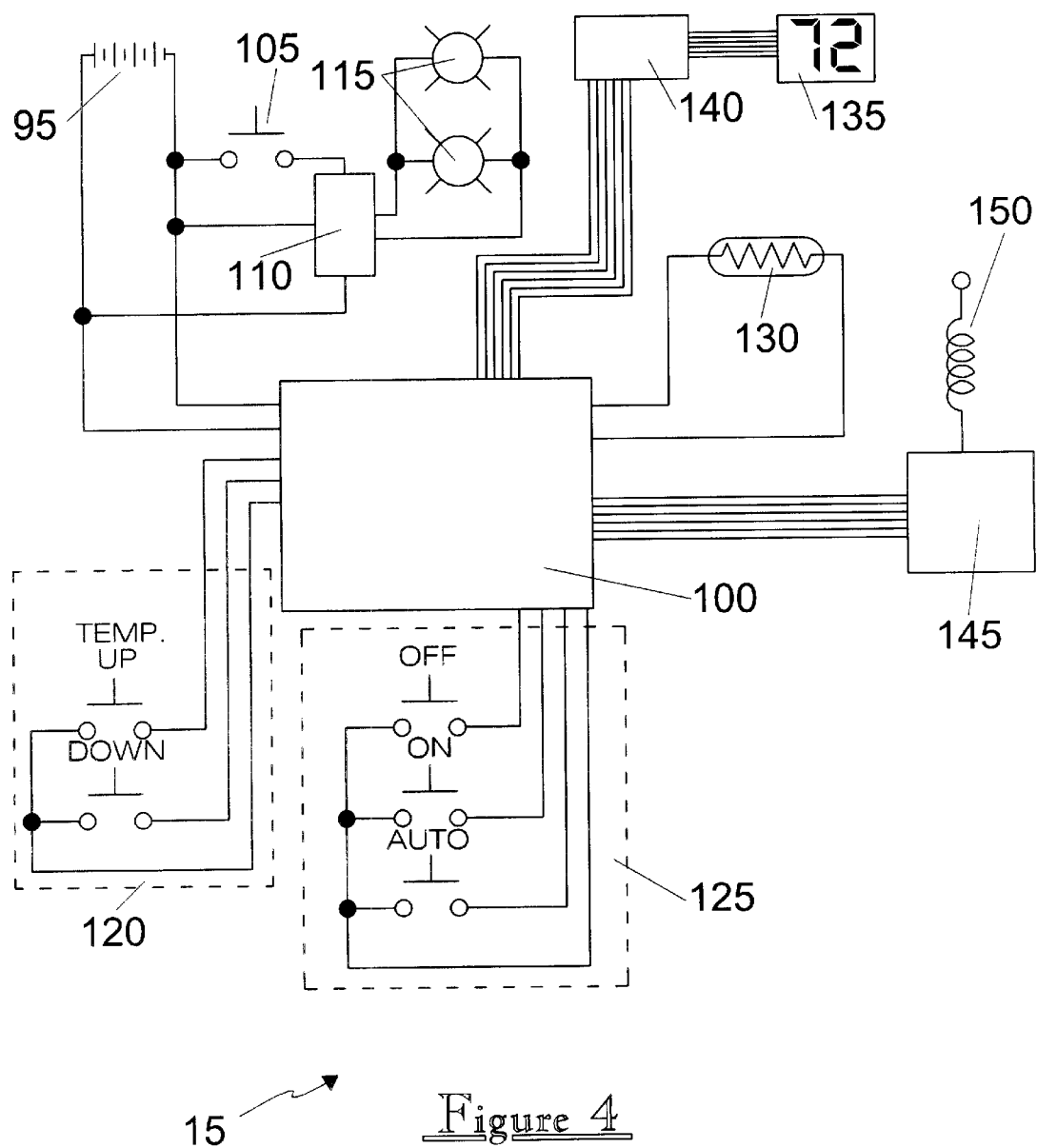
FIG. 4 is a block-type electrical diagram of the remote control unit, according to the preferred embodiment of the present invention.

Referring now to FIG. 4, a block-type electrical schematic of the remote control unit 15 from a Remote Control Thermostat, according to the preferred embodiment of the present invention is disclosed. A second battery 95 provides power to a remote microprocessor controller 100, serving as the main controlling element of the remote control unit 15. A back light control switch 105 provides an actuating signal to a light timing module 110 which energizes a series of lamps 115 for a fixed time period, envisioned to be approximately ten seconds. The lamps 115 are so situated as to illuminate any input keys as well as the output display. A set of remote temperature control pushbuttons 120 provides input signals to the remote microprocessor controller 100 in much as the same manner as the local temperature control pushbuttons 40 (as described in FIG. 3). Each command will increment or decrement the set-point temperature by 2° each. The remote temperature control pushbuttons 120 could also be a direct numerical keypad allowing for the issuing of direct temperatures to be set. A remote fan control switch 125 provides for the total control of the remote control unit 15 as well as the fan by allowing one of three inputs. First, an OFF position is provided to de-energize the remote control unit 15 as well as the associated heating and/or cooling system. Second, an ON position is provided to allow the fan associated with the heating and/or cooling system to run continuously. Finally and third, an AUTO position is provided to allow the fan to run whenever the heating and/or cooling system is operational. A remote temperature sensor 130 is provided to allow the user to determine the ambient temperature around the remote control unit 15 as an aid to determining the correct set-point. A remote readout display 135 coupled with a third display driver 140 allows the user to view the current settings of the remote control unit 15 and perform any temperature adjustments. It is envisioned the various temperatures and the corresponding set-points will alternate on the remote readout display 135 in a rotating manner. While an exact configuration will be determined with the specific programming of the remote microprocessor controller 100, the following are envisioned to be selectable:

1. Current base unit temperature
2. Current unit set-point
3. Current remote unit temperature The various settings of the base unit 10 (as shown in FIG. 3) are transmitted to the remote control unit 15 with the aid of a remote unit transceiver module 145 and a remote unit antenna 150. Likewise, the various control metrics as issued by the remote control unit 15 are transmitted to the base unit 10 (as shown in FIG. 3) as well by the remote unit transceiver module 145 and remote unit antenna 150.

Figure 5:
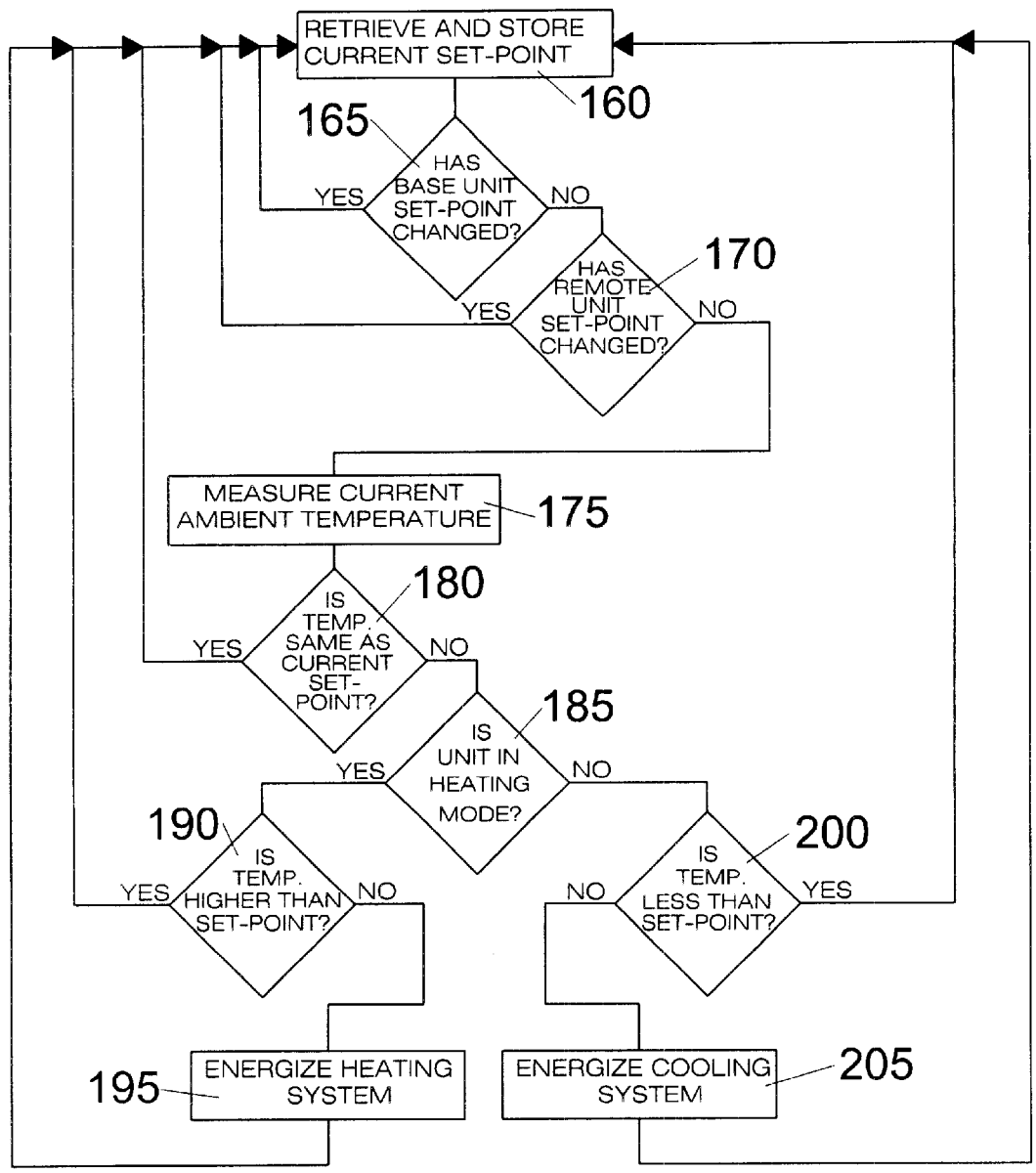
FIG. 5 is a flow diagram of the internal control logic of the Remote Control Thermostat.

Referring finally to FIG. 5, a logic flow diagram depicting the internal logic of the base unit 10 (as shown in FIG. 1) is displayed. The process begins at a first functional block 160 where the current set-point from either the base unit 10 (as shown in FIG. 1) or the remote control unit 15 (as shown in FIG. 2) is retrieved and stored in internal memory of the main microprocessor controller 35 (as shown in FIG. 2). Next, the logic flow continues to a first operational block 165 where the base unit 10 (as shown in FIG. 1) is checked for changes. A positive response forces the return to the first functional block 160. A negative response allows control to advance to a second operational block 170 where the remote control unit 15 (as shown in FIG. 2) is checked for a revised set-point as well. A positive response once again forces a return to the first functional block 160 and a negative response allows control to continue to a second functional block 175 where the ambient temperature and the current desired set-point are compared. If they are the same as determined by a third operational block 180, the control returns the first functional block 160. If they are different, the control passes to a fourth operational block 185 where it is determined if the base unit 10 (as shown in FIG. 1) is in a heating mode. If it is, as determined by a positive response, the control passes to a fifth operational block 190 where it is determined if the set-point is higher or lower than the desired ambient. If it is lower, a negative response is generated and a third functional block 195 then energizes the heating system at a third functional block 195. If it is higher, the positive response then turns control over to the first functional block 160, and heat loss conditions of the building will allow the temperature to return to the set-point. If the outcome of the fourth operational block 185 is a negative response, control passes to a sixth operational block 200, where it is determined if the ambient temperature is less than the set-point. If it is not, the negative response sends control to a fourth functional block 205 where the cooling system is energized. If it is, the positive response returns control to the first functional block 160, where heat gain will allow the temperature to return to the set-point.

2. Operation of the Preferred Embodiment

To use the present invention, one need to merely carry it into the room where one typically spends the most time in, such as the bedroom. If the user feels that they are either hot or cold, they can use the remote control unit to adjust the temperature. A display is provided constantly and normally displaying the temperature at the remote control unit. In cases where the temperature in the room could possibly be different than that near the thermostat, the user can check this information by the pressing of a button. This will display the temperature near the thermostat. This enables the user to decide whether they should input a higher or lower temperature into the remote control unit. A light key is also provided to light the keypad in the dark.

The foregoing description is included to illustrate the operation of the preferred embodiment and is not meant to limit the scope of the invention. The scope of the invention is to be limited only by the following claims.

What is claimed is:

1. An apparatus for remotely controlling the temperature of a structure, consisting of:

a base unit, said base unit having a means for sensing the local temperature within a room of said structure and comparing it to a user selected temperature input from either a keypad located on said base unit or via a radio frequency signal from a remote control unit and adjusting said local temperature to said temperature input; and at least one remote control unit, said remote control unit having a temperature sensor for sensing the local temperature, a keypad having a numeric keypad and numerous keys with specific functions, a microprocessor controller, a display, a light, and a radio frequency transceiver for transmitting a temperature input entered by a user via said keypad to said base unit, wherein said base unit can receive an instructional RF signal from any remote control unit utilizing the same carrier frequency.

2. The apparatus for remotely controlling the temperature of a structure of claim 1, wherein said main microprocessor controller receives input signals from four sources, including:

a set of local temperature control pushbuttons provide for the up and down setting of the desired temperature in predetermined temperature increments;

a fan control switch;

a temperature sensing device for local ambient air sensing;

a base unit transceiver module which interacts with the remote control unit providing both input and output signals.

3. An apparatus for remotely controlling the temperature of a structure, consisting of:

a base unit, said base unit having a means for sensing the local temperature within a room of said structure and comparing it to a user selected temperature input from either a keypad located on said base unit or via a radio frequency signal from a remote control unit and adjusting said local temperature to said temperature input, wherein said base unit includes an antenna for the transmission of RF signals and can receive an instructional RF signal from any remote control unit utilizing the same carrier frequency; and at least one remote control unit, said remote control unit having a temperature sensor for sensing the local temperature, a keypad having a numeric keypad and numerous keys with specific functions, a microprocessor controller, a display, a light, and a radio frequency transceiver for transmitting a temperature input entered by a user via said keypad to said base unit, wherein said main microprocessor controller further provides three sets of output signals comprising:

current ambient temperature, said current ambient temperature signal for displaying on an ambient temperature readout, said ambient temperature readout receiving its signal through a first display driver which is electrically coupled to said main microprocessor controller;

current set-point of the Remote Control Thermostat, said current set-point displayed on a set-point temperature readout, said set-point temperature readout receiving its signal through a second display driver which is electrically coupled to said main microprocessor controller; and operational signals from said main microprocessor controller through an output control relay module, said output control relay module capable of providing signals to energize the heating equipment, to energize the cooling equipment and to energize the fan portion of either the heating or cooling equipment.

4. The apparatus for remotely controlling the temperature of a structure of claim 3, wherein said remote control unit comprises a portable, handheld device having an input keypad, a digital display, an RF transceiver, a temperature sensor, and a microprocessor.

5. The apparatus for remotely controlling the temperature of a structure of claim 3, wherein said temperature sensor constantly monitors the temperature local around remote control unit, and wherein said temperature information is available to the user via a button on said keypad.

6. The apparatus for remotely controlling the temperature of a structure of claim 5, wherein instructions are sent via said keypad to said microprocessor which in turn sends it to said transceiver to be carried to said base unit to adjust the temperature.

* * * * *